(12) United States Patent
Benz et al.

(10) Patent No.: US 8,184,301 B2
(45) Date of Patent: May 22, 2012

(54) SURFACE ALIGNMENT AND POSITIONING METHOD AND APPARATUS

(75) Inventors: Patrick H. Benz, Sarasota, FL (US); Stephen R. Grant, Sarasota, FL (US); Armin Ebrahimpour, Sarasota, FL (US)

(73) Assignee: Benz Research and Development Corporation, Sarasota, FL (US)

( * ) Notice: Subject to any disclaimer, the term of this patent is extended or adjusted under 35 U.S.C. 154(b) by 258 days.

(21) Appl. No.: 12/544,116

(22) Filed: Aug. 19, 2009

(65) Prior Publication Data

US 2011/0043829 A1    Feb. 24, 2011

(51) Int. Cl.
*G01B 11/24* (2006.01)

(52) U.S. Cl. ......................... 356/614; 356/615
(58) Field of Classification Search .......... 356/614–624, 356/123–127
See application file for complete search history.

(56) References Cited

U.S. PATENT DOCUMENTS

| | | | |
|---|---|---|---|
| 4,084,458 A | 4/1978 | Galley | |
| 4,149,801 A * | 4/1979 | Volk | 356/124 |
| 5,080,482 A | 1/1992 | Bent et al. | |
| 5,526,073 A | 6/1996 | Mattioli | |
| 5,597,498 A | 1/1997 | Sunayama et al. | |
| 5,760,889 A * | 6/1998 | Manning | 356/124 |
| 5,760,906 A | 6/1998 | Sato | |
| 5,794,498 A | 8/1998 | Chaloux | |
| 5,908,348 A | 6/1999 | Gottschald | |
| 6,051,844 A | 4/2000 | Au | |
| 6,441,386 B2 | 8/2002 | Sakaguchi | |
| 6,563,098 B2 | 5/2003 | Gweon et al. | |
| 7,347,548 B2 | 3/2008 | Huang et al. | |
| 7,359,068 B2 | 4/2008 | Yonescu | |
| 7,486,409 B2 | 2/2009 | Yamashita et al. | |
| 7,494,892 B2 | 2/2009 | Ishibashi et al. | |
| 7,499,185 B2 | 3/2009 | Nomaru et al. | |
| 2001/0000904 A1* | 5/2001 | Hashimoto et al. | 228/103 |
| 2005/0140981 A1* | 6/2005 | Waelti | 356/479 |
| 2005/0219551 A1 | 10/2005 | Eriguchi et al. | |

OTHER PUBLICATIONS

Keyence, Surface Scanning Laser Confocal Displacement Meter, LT-9000 Series, Keyence Corporation of America (2004).
PCT International Search Report and Written Opinion on application No. PCT/US2010/045591 dated Oct. 14, 2010; 10 pages.

* cited by examiner

*Primary Examiner* — Michael P Stafira
(74) *Attorney, Agent, or Firm* — Foley & Lardner LLP

(57) ABSTRACT

A method and apparatus for aligning and positioning a surface such that the optical and/or cylinder axis of the surface is precisely aligned with a fixture for the purpose of assembly or further mechanical operations such as machining and polishing. According to another aspect of the invention, a lens apex is located and precisely positioned a constant distance from a reference point. In order to implement the above, a method and apparatus is disclosed for optically aligning and positioning surfaces using a precision laser displacement measurement device, an X-Y-Z micron stage, and a microprocessor (or computer) capable of performing curvature analysis.

18 Claims, 4 Drawing Sheets

SURFACE ALIGNMENT AND POSITIONING METHOD AND APPARATUS

BACKGROUND OF THE INVENTION

This invention relates to a method and apparatus for aligning and positioning a workpiece, such as a lens, so that an axis of the workpiece is precisely aligned with a fixture and a surface of the workpiece is precisely positioned a constant distance from a reference point on the fixture. The invention has particular application in the field of manufacturing contact lenses and intraocular lenses, but it not limited to this application.

In the manufacture of lenses, the degree of accuracy of alignment of a partially finished lens to its fixture, e.g., a mandrel, determines the limit of concentricity possible through subsequent machining operations. A high degree of concentricity is advantageous in the manufacture of lenses since greater concentricity results in less prism. The accuracy of positioning the apex of the lens to a reference point or shoulder of the fixture determines the accuracy of the manufactured lens thickness. A high degree of consistency of lens thickness is advantageous for the manufacture of lenses. Such precise positioning, however, can be time consuming and difficult to obtain if done manually.

An example of the use of this invention is in the manufacture of contact lenses and intraocular lenses. However, the invention is not so limited and the principles of the invention may be applied to the manufacture of other types of lenses or objects other than lenses. For purposes of example only, the process of manufacturing contact lenses will be described.

Contact lenses are typically manufactured by way of a complex multi-step operation whereby the fabricated lens goes through many precision operations. The technique described in U.S. Pat. No. 5,080,482, the disclosure of which is hereby incorporated by reference in its entirety, makes use of a camera and a focusing reticle video image in order to automatically align a lens. The reticle image is focused on the surface of the lens and then analyzed using a focusing algorithm. Although accurate, the process can be time consuming and may be limited to a small range of measurable optical radii.

It is therefore desirable to improve upon the prior techniques, such as described in U.S. Pat. No. 5,080,482, with respect to the possible range of optical radii that can be accurately aligned and positioned as well as to decrease the speed or cycle time of the process. It is desired to allow for quicker measurement of a wide range of radii and optical surfaces beyond sphere radii including, but not limited to, cylinder shapes, toroids, or any geometric figure with a high or low point representing the center of the optic.

SUMMARY OF THE INVENTION

According to one embodiment of the invention, a method for determining the apex of a curved surface of a workpiece includes positioning the workpiece in relation to a laser displacement measurement device. Displacement between the laser displacement measurement device and the curved surface is then measured at a series of points on said surface. The apex of the surface is then calculated based on the interpolated data of such coordinates of the points, including the measured displacement between the laser and the surface.

According to another embodiment of the invention, an apparatus for determining the apex of a curved surface of a workpiece includes a laser displacement measurement device, a stage for positioning the workpiece in relation to the laser displacement measurement device; and a processor configured to calculate the apex of said surface based on displacement between the laser displacement measurement device and the curved surface at a series of points on said surface.

According to an aspect of the invention, a first series of displacements are measured along a first axis perpendicular to the optical axis of the laser displacement measuring device and a second series of displacements are measured along a second axis perpendicular to the first axis and the optical axis of the laser displacement measuring device. The first series of displacement measurements define correspond to (x, z) coordinates along a first secant of said surface in an X-Z plane and the second series of displacement measurements define correspond to (y, z) coordinates along a second secant of said surface in an Y-Z plane. The (x, y, z) coordinate of the apex are determined and recorded.

According to another aspect of the invention, radii of curvature of the surface is also determined.

In certain embodiments, the workpiece is a lens blank with a finished base curve surface for a contact lens or an interocular lens. In such embodiments, the measured apex can be used for lens blocking in which the said lens blank is positioned with respect to a holder such that the axis of said lens blank is in optical alignment with said holder and the finished surface is attached to the holder so that the opposing surface can be machined.

In some embodiments, the laser displacement measuring device is a confocal laser that can measure displacement accurately, preferably within at least 0.0001 millimeters.

According to another embodiment of the present invention, a finished base curve surface is placed in a fixture attached to the X-Y part of an X-Y-Z micron stage. A series of laser displacement measurements are obtained by scanning the surface to determine a secant of the surface. The X-Y-Z micron stage is rotated 90°, under computer control, and a second set of laser displacement measurements is obtained by scanning the surface to determine a second secant of the surface. The scanned displacement measurements are then analyzed to determine the apex of the surface.

The present invention offers several distinct advantages over the prior art. Specifically, it provides for a greater range of radii that can be aligned and positioned. The laser does not have the limitation of focal length of conventional optical systems which may limit the convex radii to 26 mm or steeper. Furthermore, the present laser alignment and positioning system is significantly faster, which reduces cycle time and subsequently the cost of manufacturing.

Moreover, the present invention also utilizes technology and equipment that can be advantageously employed in a fully automated manufacturing process. The lens surface can be aligned, positioned, and blocked by computer control; no manual operations are required. This greatly reduces the cost of manufacture.

DETAILED DESCRIPTION OF THE PREFERRED EMBODIMENTS

Figure 1A:
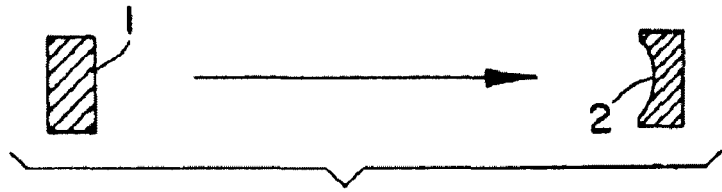
FIGS. 1a-1d are diagrammatic representation of a conventional blocking operation for a lens.
Figure 1B:
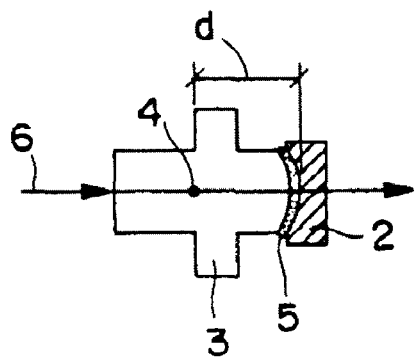
Figure 1C:
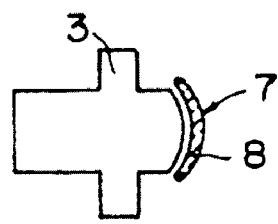
Figure 1D:
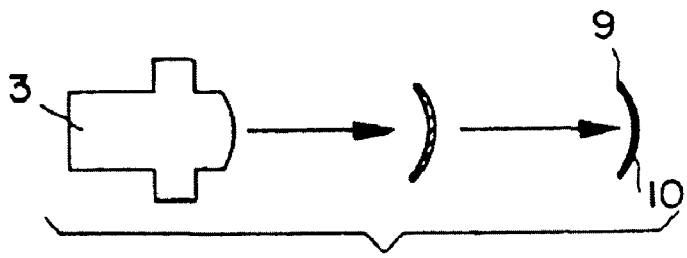

FIGS. 1a-1d illustrate a conventional blocking operation for a lens. As shown in FIG. 1a, generally the first stage of manufacture forms a polished lens surface 2 on a "blank" 1 of plastic. The optical lens is then precisely fixed to a block 3 with a suitable material such as wax or cement 5 so that a second surface of the lens can be machined. This stage is commonly referred to as "blocking" the lens. The third stage (FIG. 1c) forms a polished optical surface 7 of a fixed diameter on the second surface of the lens 8 thereby forming a contact lens. The fourth stage (FIG. 1d) involves removing the finished lens and polishing the edges 9 of the lens 10 in a known manner.

In order to minimize prism and maximize concentricity of the manufactured lens, and to precisely control the thickness of the manufactured lens, it is important to precisely align an axis 6 of the lens, such as the optical axis, and to ensure that a portion of the lens, e.g., the apex, is precisely positioned a constant distance d from a reference point 4.

Figure 2:
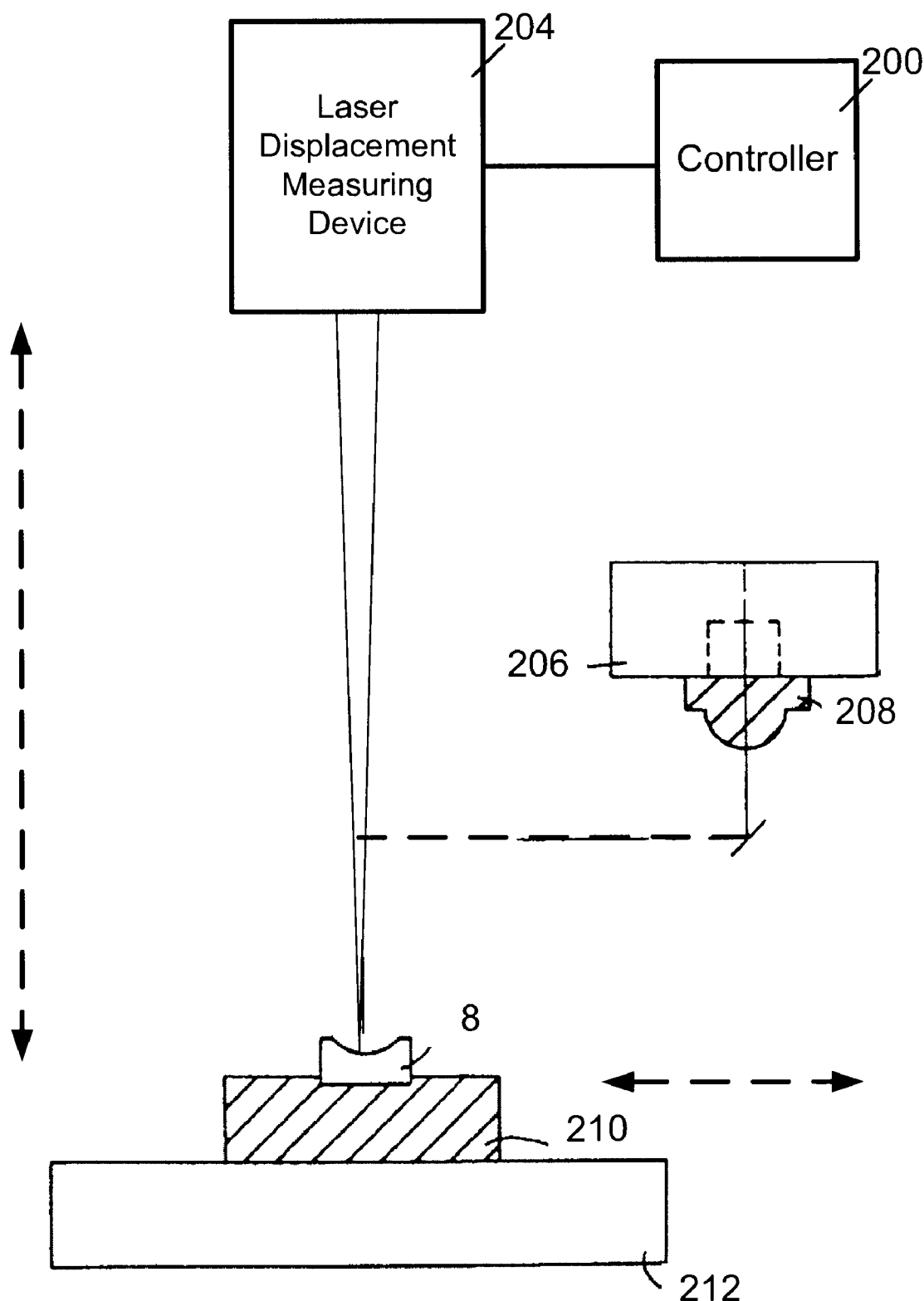
FIG. 2 is a diagrammatic representation of an apparatus capable of carrying out the present invention.

With reference to FIG. 2, there is shown an apparatus according to one embodiment of the present invention. Specifically, there is disclosed an alignment and positioning apparatus for aligning and positioning a workpiece in order to enable precise alignment to be performed automatically under computer control without the need for manual alignment.

As shown in FIG. 2, a controller 200, such as a computer or microprocessor is provided, which is configured to determine an apex from displacement measurements. Controller 200 may include a computer readable storage device and a display device. The controller 200 has digital analysis capability and functions to control movement of an X-Y-Z micron stage 212. Z-axis movement is in small, arbitrary, known units from some reference point designated Z=0.

There is also provided a laser displacement measurement system 204 with an optical axis arranged in the Z-direction. This system 204 is configured for highly accurate measurements of displacement in the Z-direction using scanning laser. For example, the laser 204 has a preferred minimum displacement measurement accuracy of 0.0001 mm, for a lens alignment accuracy of 0.003 mm to 0.005 mm. The preferred beam width of the laser is 0.002 mm. Larger beam widths may be used with a resulting effect on the displacement measurement accuracy of steeper radii. The laser system may comprise a confocal laser system, such as a Keyence measuring unit LT-9010M.

Also shown in FIG. 2 is a chuck or other suitable holding structure 206 for holding a block 208, and a workpiece 8, such as a lens, attached to a fixture assembly 210. Fixture assembly 210 is operably connected to the X-Y axis of the X-Y-Z micron stage 212. The chuck 206 is mounted to the side a predetermined distance from the laser axis and mechanically aligned so as to be parallel to the laser axis.

According to a preferred embodiment of the present invention, the laser generates a series of displacement measurements by scanning the lens surface, the data is stored, and the scan is repeated at a rotation of 90° compared to the previous scan. The second set of data is stored, and an analysis is performed to determine the apex height (Z-position) and lens center (X,Y coordinates) using the two sets of displacement. According to the amount of speed and accuracy desired, which will vary from application to application, various digital analysis techniques may be used. Possible techniques include scans utilizing a fewer or greater number of displacement measurement data points and/or scans performed at faster or slower speeds. Both the number of data points, length of scan, and scan speed can increase or decrease accuracy versus speed depending on the application.

According to a preferred embodiment, the centering operation determines the exact apex center line of the lens and the apex height of the lens. After these positions are determined and information corresponding to the respective positions is stored in a computer readable storage device of controller 200, the block may be inserted into chuck 206 and hot wax is deposited onto the lens surface. The computer then moves the Z-axis down to a point above the lens, which allows the apex to be fixed at the desired distance from the reference position, based on the information stored in the computer. Once any desired operations have been performed, the computer moves the Z-axis away so that the lens, which is now fixed to the block, can be removed and the process repeated for the next lens.

Figure 3:
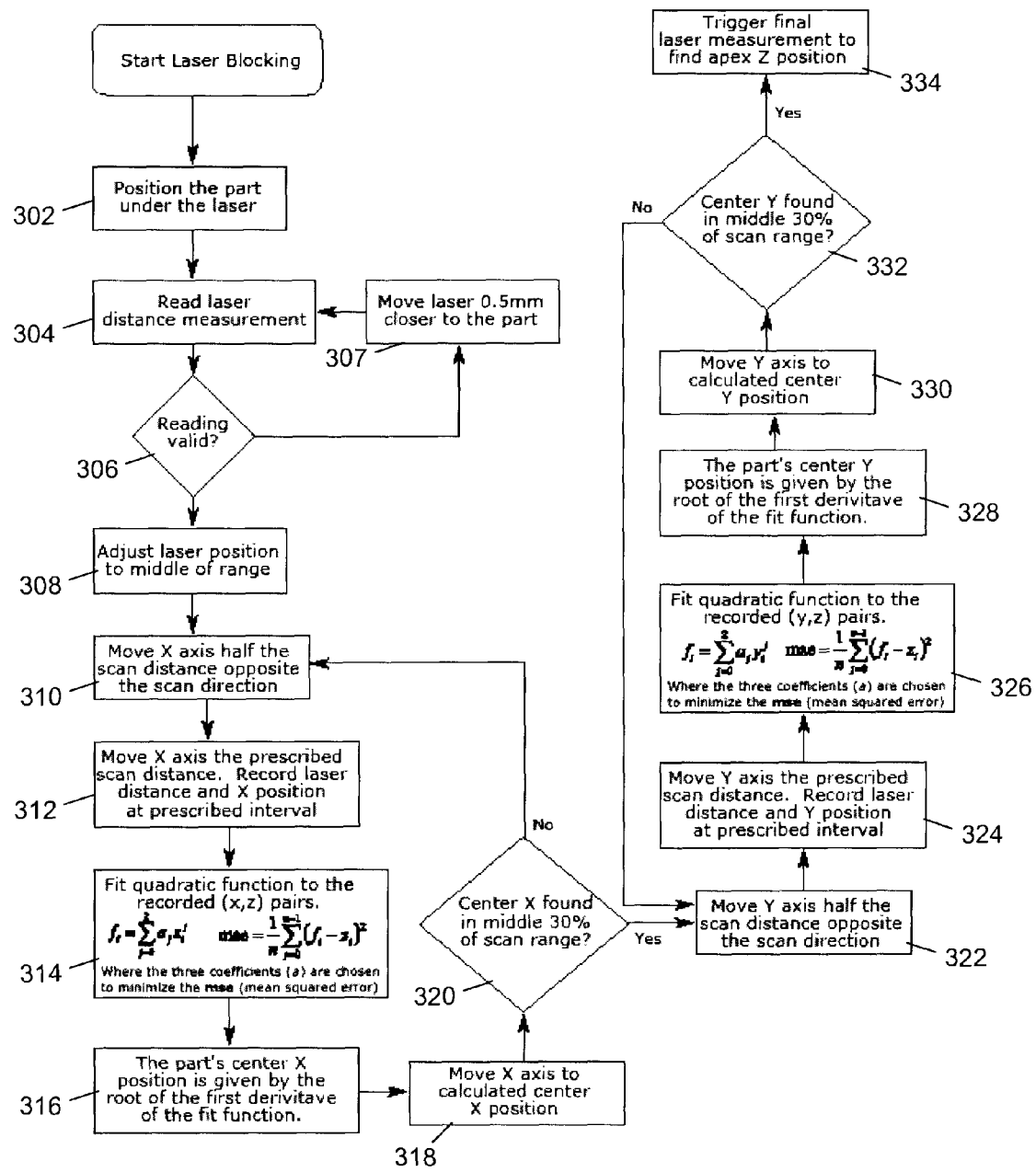
FIG. 3 is a flow chart illustrating a process according to an embodiment of the present invention to determine the apex of a curved surface.

FIG. 3 is a flow chart illustrating operation of an alignment system according to an embodiment of the present invention. The lens is inserted into a holder connected to the X-Y part of the X-Y-Z micron stage and positioned under the laser displacement device (302). A distance between the laser and the device along the Z-axis is measured by scanning the surface of the lens with a predetermined beam distance (304). The distance measurement is verified (306). Next, the laser is moved a predetermined distance (in this example, 0.5 mm) closer to the lens (307). This process is repeated until a range of displacement measurements are obtained. The distance between the laser and the lens is then adjusted to a distance in the middle of the range (308).

The relative displacement of the laser and the lens is then moved along the X-axis in a direction opposite the scan direction by a predetermined distance, in this example, half the scan distance of the laser (310). The relative distance is adjusted along the X-axis by the scan distance and the displacement between the laser and the lens surface along the Z-axis is then recorded along with the position on the X axis (312). This process is repeated to obtain a series of (x,z) coordinate pairs. From these pairs, a curve on the surface of the lens in the X-Y plane (i.e, a secant) can be determined. In this example, this is determined by fitting a quadratic function to the recorded (x,z) pairs according to the following expression (314):

$$f_i = \sum_{j=0}^{2} a_j x_i^j$$

Here, the mean squared error (mse) is equal to $$\frac{1}{n}\sum_{j=0}^{n-1} (f_1 - z_i)^2.$$

The three coefficients (a0, a1, a2) are chosen to minimize the mean squared error. The center X position of the lens is then given by the root of the first derivative of the fit function (314).

Once the center X position of the lens is calculated, the relative displacement of the lens and the laser in the X-direction is adjusted so that the lens is centered at the calculated center X position (318). In this example, it is then verified whether the center X position is within the a predetermined portion of the scan range, in this case, the middle 30% of the scan range (320). If this is not the case, the above-noted process is repeated. Otherwise, the center Y position is determined in a similar manner.

Specifically, the relative displacement between the laser and the part is adjusted in the Y-direction by moving the lens half the scan distance opposite to the scan direction (322). The relative displacement in the Y direction is then adjusted by the prescribed scan distance and the distance in the z direction and y position is recorded along a certain interval to obtain a series of (y,z) pairs (324). A curve of the surface of the lens in the Y-Z plane is then determined by fitting a quadratic function to the recorded (y,z) pairs, and the coefficients of the quadratic equation are chosen to minimize the mse (326). The lens' center Y position is then given by the root of the first derivative of the fit function (328).

The lens is moved to the calculated center Y position (330) and it is verified whether this position is within the predetermined potion of the scan range, in this example, the middle 30% (332). If this is not the case, the process is repeated to determine the curve of the surface along the Y-Z plane. Otherwise, the lens is centered in the center X and center Y position that corresponds to the apex and the displacement in the Z direction is determined to find the z coordinate for the apex (334).

In this way, the apex of the lens may be determined precisely by measuring points along the surface of the part to define at least two secants. The scan consists of taking a series of displacement measurements along a curve of the surface of the lens with the laser in order to determine a secant. Next, the lens surface is scanned a second time, after being rotated 90° with respect to the first scan by way of computer controlled manipulation of the X and Y axis. Again, the scan consists of taking a series of displacement measurements along a curve of the surface of the lens with the laser in order to determine a secant. Using the two sets of displacement data and the corresponding secants, the apex height is calculated and the Z-position recorded. At the same time, the (x,y) coordinates of the apex are also calculated and recorded.

It will be appreciated that in embodiments of the invention, relative displacement between the laser and the lens may be adjusted by moving either the laser or the lens.

Figure 4:
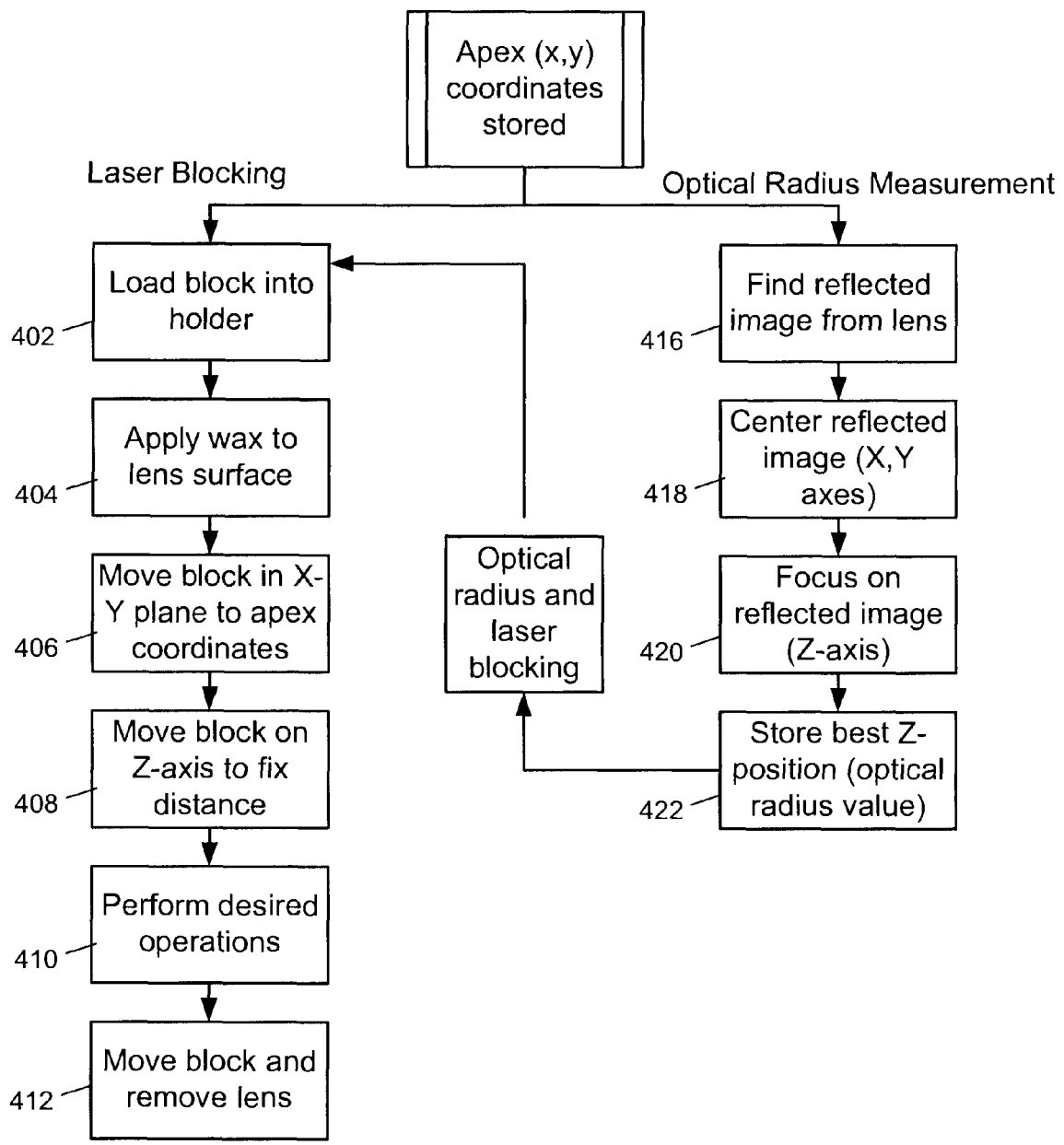
FIG. 4 is a flow chart illustrating a process according to an embodiment of the invention in which the determined apex is used for subsequent optical radius measurement or lens blocking.

Once the apex of the lens is determined, it is possible to measure the radii of the lens optically and/or implement lens blocking as illustrated in FIG. 4.

Specifically, optical radius measurement may be performed according to the technique described in U.S. Pat. No. 5,080,482. Such process includes obtaining a reflected image from the lens surface (416) and centering the image in the X-Y plane (418). The reflected image is focused (420) and the best Z-position (i.e., optical radius value) is determined (422).

Blocking may include loading a block into a holder (402) and applying wax or other suitable material to the lens surface (404). The block is then positioned at the (x,y) coordinates of the apex (406). The block is then moved along the Z-axis to a fix distance (408) at which desired operations may be performed (410). The lens may be fixed to the block and removed (412). In this manner, the lens can be fixed to the block with great alignment precision between the lens apex that the block so that the opposing surface of the lens can be machined.

It will be appreciated that the system and process according the invention can also be used to determine the optical radii of the lens. Other advantages of the invention will be appreciated by those skilled in the art.

The present invention is not limited to use in manufacturing lenses. It will be readily apparent that the present invention can also be used for the precise alignment of other devices including laser sighting devices, gun sights, telescopes, etc., by using different algorithms and analysis techniques to analyze displacement measurements taken by a laser and images transmitted through reflected lenses or by mirrors and convex lenses. The invention is only limited by the claims appended hereto.

What is claimed is:

1. A method for positioning a lens blank on a block, the method comprising:
    positioning the lens blank in relation to a laser displacement measurement device such that a concave surface of the lens blank faces the laser displacement measurement device;
    measuring displacement between the laser displacement measurement device and the concave surface to determine positions of a series of points on said concave surface;
    determining an apex center line and an apex position of the lens blank based on the determined positions of the points; and
    attaching the block to the lens blank such that the apex center line of the lens blank is aligned with an axis of the block and the apex position is fixed at a predetermined distance from a reference point on the block.

2. The method of claim 1, wherein measuring displacement includes measuring a first series of displacements along a first axis perpendicular to the optical axis of the laser displacement measuring device and measuring a second series of displacements along a second axis perpendicular to the first axis and the optical axis of the laser displacement measuring device.

3. The method of claim 2, wherein the first series of displacement measurements define (x, z) coordinates along a first secant of said surface in an X-Z plane and the second series of displacement measurements define (y, z) coordinates along a second secant of said surface in an Y-Z plane.

4. The method of claim 3, wherein determining the apex position includes determining the (x, y, z) coordinate of the apex of said concave surface.

5. The method of claim 1, further comprising determining radii of curvature of said concave surface.

6. The method of claim 1, wherein the lens blank is a contact lens blank.

7. The method of claim 1, wherein the lens blank is an interocular lens blank.

8. The method of claim 1, wherein the laser displacement measuring device is a confocal laser.

9. The method of claim 8, wherein the laser displacement device measures displacement within at least 0.0001 millimeters.

10. An apparatus for positioning a lens blank on a block, the apparatus comprising:
    a laser displacement measurement device;
    a stage configured to position the lens blank in relation to the laser displacement measurement device such that a concave surface of the lens blank faces the laser displacement measurement device, wherein the laser displacement measurement device is configured to measure displacement between the laser displacement measurement device and the concave surface; and
    a processor configured to:
        determine positions of a series of points on the concave surface,
        determine an apex center line and an apex position of the lens blank based on the determined positions of the points, and
        initiate an attachment of the block to the lens blank such that the apex center line of the lens blank is aligned with an axis of the block and the apex position is fixed at a predetermined distance from a reference point on the block.

11. The apparatus of claim 10, wherein the processor is further configured to adjust the relative position the workpiece and the laser displacement, record a first series of displacements along a first axis perpendicular to the optical axis of the laser displacement measuring device, and record a second series of displacements along a second axis perpendicular to the first axis and the optical axis of the laser displacement measuring device.

12. The apparatus of claim 11, wherein the first series of displacement measurements define (x, z) coordinates along a first secant of said surface in an X-Z plane and the second series of displacement measurements define (y, z) coordinates along a second secant of said surface in an Y-Z plane.

13. The apparatus of claim 12, wherein determining the apex position includes determining the (x, y, z) coordinate of the apex of said concave surface.

14. The apparatus of claim 10, further comprising determining radii of curvature of said concave surface.

15. The apparatus of claim 10, wherein the lens blank is a contact lens blank.

16. The apparatus of claim 10, wherein the lens blank is an interocular lens blank.

17. The apparatus of claim 10, wherein the laser displacement measuring device is a confocal laser.

18. The apparatus of claim 17, wherein the laser displacement device measures displacement within at least 0.0001 millimeters.

* * * * *